Fig. 1

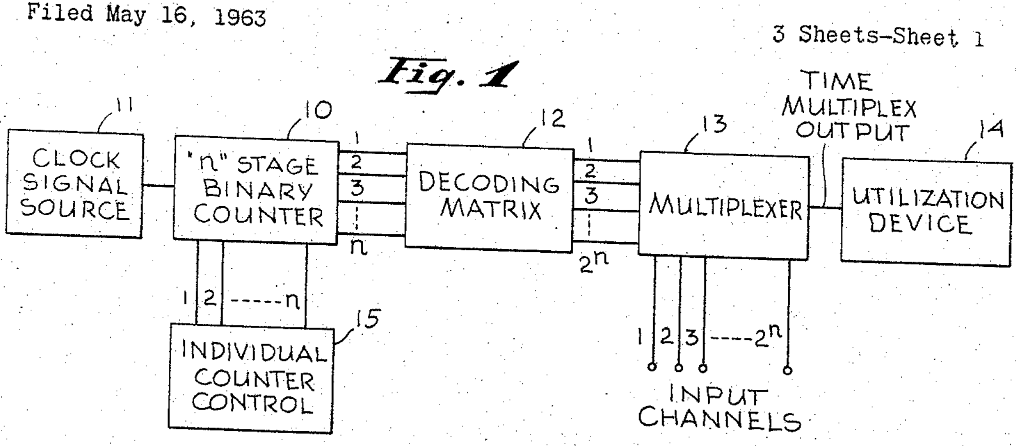

| DECODING MATRIX INPUT $(2^2)(2^1)(2^0)$ C B A | OUTPUT COUNTER OUTPUT |
|---|---|
| 0 0 0 | 1 |
| 0 0 1 | 2 |
| 0 1 0 | 3 |
| 0 1 1 | 4 |
| 1 0 0 | 5 |
| 1 0 1 | 6 |
| 1 1 0 | 7 |
| 1 1 1 | 8 |

(a) NORMAL

| COUNTER STAGES $(2^1)(2^0)$ C A | OUTPUT COUNTER OUTPUT ALSO CHANNEL SELECTED |
|---|---|
| 0 0 | 1 |
| 0 1 | 2 |
| 1 0 | 3 |
| 1 1 | 4 |
| 0 0 | 1 |
| 0 1 | 2 |
| 1 0 | 3 |
| 1 1 | 4 |

(b) B STAGE CLAMPED OUT

| DECODING MATRIX INPUT $(2^2)(2^1)(2^0)$ C B A | OUTPUT COUNTER OUTPUT ALSO CHANNEL SELECTED |
|---|---|
| 0 1 0 | 3 |
| 0 1 1 | 4 |
| 1 1 0 | 7 |
| 1 1 1 | 8 |
| 0 1 0 | 3 |
| 0 1 1 | 4 |
| 1 1 0 | 7 |
| 1 1 1 | 8 |

(c) B STAGE CLAMPED -1-

| DECODING MATRIX INPUT $(2^2)(2^1)(2^0)$ C B A | OUTPUT COUNTER OUTPUT ALSO CHANNEL SELECTED |
|---|---|
| 0 0 0 | 1 |
| 0 0 1 | 2 |
| 1 0 0 | 5 |
| 1 0 1 | 6 |
| 0 0 0 | 1 |
| 0 0 1 | 2 |
| 1 0 0 | 5 |
| 1 0 1 | 6 |

(d) B STAGE CLAMPED -O-

Fig. 2

ROBERT E. GOTTFRIED
GEORGE F. MARSH
INVENTORS

BY [signature]
AGENT

ROBERT E. GOTTFRIED
GEORGE F. MARSH
INVENTORS

BY Gerald Seigel
AGENT

ROBERT E. GOTTFRIED
GEORGE F. MARSH
INVENTORS

BY Gerald Sieger
AGENT

United States Patent Office 3,337,720

Patented Aug. 22, 1967

3,337,720
MULTIPLEXING SYSTEM

Robert E. Gottfried, Torrance, and George F. Marsh, Long Beach, Calif., assignors, by mesne assignments, to TRW Inc., a corporation of Ohio Filed May 16, 1963, Ser. No. 280,830
9 Claims. (Cl. 235—92)

This invention relates to a multiplexing system and more particularly to an improved controllable multiplexing system of great simplicity.

The utility of time multiplexed formats for use in telemetry, communications, and data processing has been well established over the years. Among the advantages of this type format are the ability for many inputs to share common equipment and carriers thus eliminating cross modulation problems, and improving the adaptivity of digital techniques for simplifying processing. The majority of telemetry formats are fixed according to some prearranged sampling plan. To ensure adequate sampling rates for new experiments estimates are usually made based on the highest information rates expected. This practice has often resulted in great transmission inefficiency since most data channels rarely require continuous sampling at the highest information rates expected thereby resulting in redundant information. Since measurement requirements are continuing to expand, the inefficiency resulting from a fixed format with the resulting redundancy is wasteful and expensively tolerable for ground based equipment but extremely inefficient for space communication (where constraints on available satellite weight and power are severely limited).

This invention describes a controllable format generation system having great simplicity in terms of implementation and operational usage. The resulting system can be controlled by external command or self-adaptive means to select different formats depending on the information needed.

The significant advantages of the invention over existing techniques is the great simplicity in the implementation of the logic and the operational ease of selecting the variable formats. Additionally, new format instructions do not require complex decoding trees but are decoded directly and more important the design does not have to be tailored to a particular application, but is standard for all possible formats.

The invention is described in connection with the fields of comunications and telemetry by way of example only in order to more fully describe a preferred embodiment in which many inputs share a common carrier. As described, the time shared carrier may represent a radio carrier (RF) suitable for space activities or just hard wire transmission line for ground activities. The invention has particular applicability for space satellites and other space probes where reliability, weight and power requirements are stringent and where external considerations make it desirable to change the multiplexing format in a simple manner.

In practicing the invention, a plurality of counters in an ordered relationship, each having at least two states and adapted to receive repetitive input or clock signals are used. For example, a binary counter may be used having a number of states, $n$, such that $2^n$ is equal to or greater than the maximum number of input signals being sampled. In the conventional selection of these $2^n$ inputs, the counter will run normally and a decoding matrix driven from each of the $n$ stages provides the sequential selection gates. In order to achieve variability in both the sampling rates and the inputs to be sampled, the format is changed by clamping selected states in each of the counter stages and causing the clock pulses to bypass each clamped stage of the counter. By selectively clamping individual stages of each counter in combinations of zero or one a plurality of different formats are possible.

Further objects and advantages will be made more apparent by referring now to the accompanying drawings wherein:

FIG. 1 is a block diagram of an adaptive format generator;

FIG. 2 is a series of truth tables for illustrating the benefits of the invention;

Figure 3:
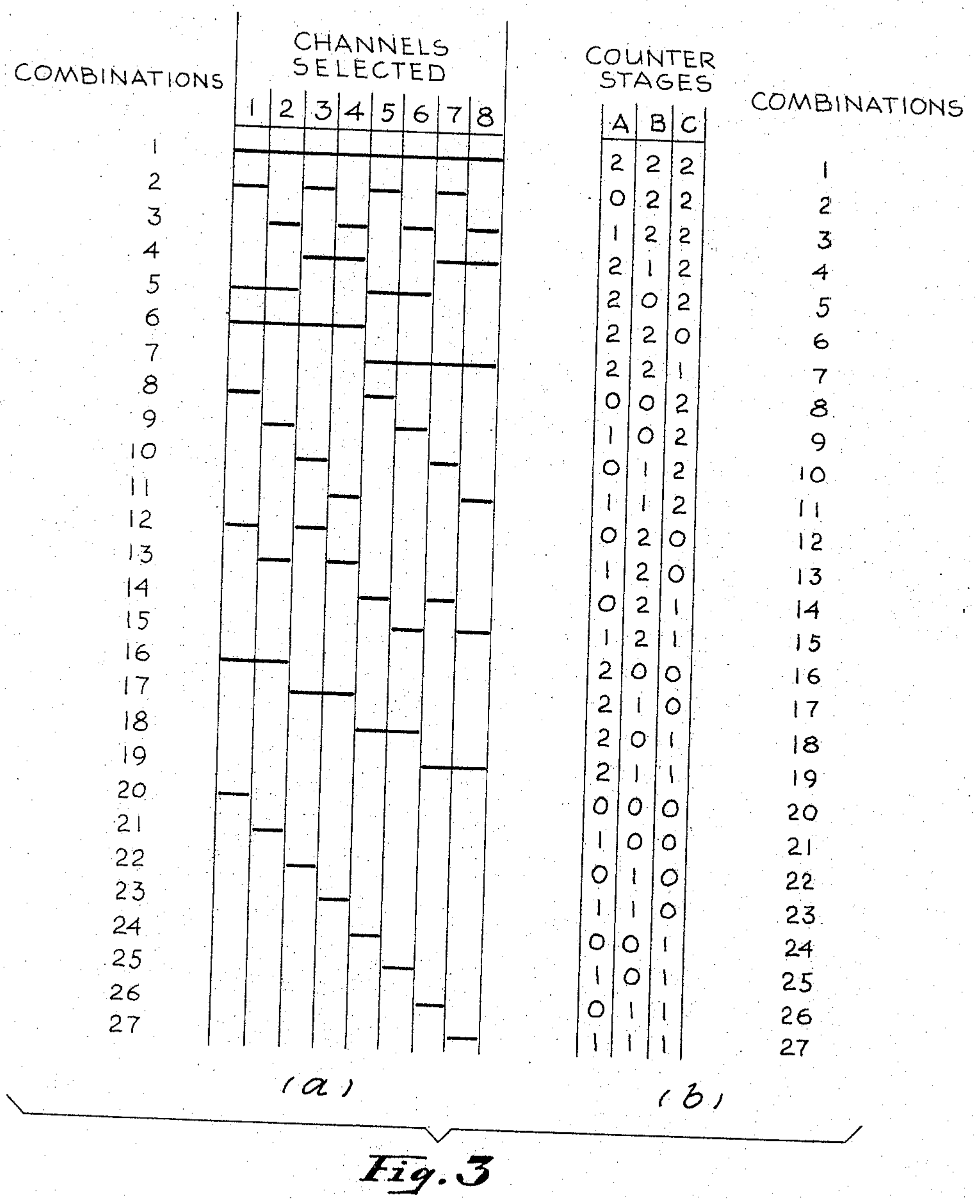
FIG. 3 is a graph illustrating the possible format combinations using a three stage binary counter according to this invention.

Referring now to FIG. 1 there is shown a block diagram of a preferred embodiment of the invention using a binary counter 10 having a plurality of $n$ stages in an ordered relationship. A clock signal source 11 or other sampling rate determining source of pulses is arranged to continuously feed the binary counter 10. Each of the individual stages of the binary counter 10 feeds a decoding matrix 12 which continuously generates an output signal indicative of the condition of the individual states of the $n$ stages in the binary counter 10. Since a binary counter was selected for the example it can be shown that the total number of individual output signals will be $2^n$ where $n$ is the number of stages in the binary counter 10. The output lines from the decoding matrix 12 feed a multiplexer 13 which also receives a like number of input channels one from each experiment being sampled. The output of the multiplexer 13 at any given time will be a selected signal channel corresponding to the output from the decoding matrix 12 for transmission to a utilization device 14 which may be a recording device, computer or telemetering transmitter.

The system as described is a conventional means for generating selection signals for time multiplexing where an $n$ stage binary counter is driven at the sampling rate and the output is decoded by a matrix to provide $2^n$ outputs for sequentially selecting the input channels. If we assume that binary counter 10 is a three stage counter having stages A, B and C, the Truth Tables illustrated in FIG. 2 and specifically Table 2*a* will show the normal sequence of advancing the individual stages in counter 10 and the effect in the output sequence from the decoding matrix 12. A review of the Truth Tables in FIG. 2 will show that for the normal format a three stage binary counter can sample $2^n$ or 8 channels. The selection will be continuous and repetitive. In this invention a control over both the sampling rate and the signal channels to be sampled is based on skipping over unwanted portions of the binary counting Truth Table. The counter is thus caused to operate in different modes which relate to different formats. The skipping or bypassing of portions of the binary counter is achieved by means of an individual counter control 15 illustrated in FIG. 1 which provides the means for clamping any one or more stages of the counter 10 in either a binary 1 or true state, or a binary 0 or false state. The counting process continues as illustrated in Table 2*b* as if the clamped stage assuming it to be stage B was not a member of the counter. On the other hand, the decoding matrix 12 continues to receive all outputs of the counter including the clamped stages as illustrated by Tables 2*c* and 2*d*. The clamping of stage B by control 15 to either a binary 1 or binary 0 also causes stage C to act as the second stage of the counter and count at twice the normal rate since stage B by being clamped is no longer a receiving member of the counter. If stage B was physically omitted the output sequence would be 1, 2, 3, 4, 1, 2, 3, 4 as shown in Table 2*b*. However, in practicing this invention, the clamped counter does not receive additional clock pulses, but it does indicate the clamped information to the decoding matrix.

If we consider the situation where stage B is clamped to a true binary 1 state then Truth Table 2*c* in FIG. 2 will illustrate the sequence of selected channels to be 3, 4, 7, 8, 3, 4, 7, 8. In a similar manner by clamping stage B to a false or binary 0 state, Truth Table 2*d* will show the sequence to be 1, 2, 5, 6, 1, 2, 5, 6.

The clamping technique allows each stage of a counter to have one of three states, that is the normal state (or unclamped), the clamped binary 1 state, or the clamped binary 0 state. Consequently there is produced a trinary logic system which for an *n* stage counter can have a total number of format combinations, $N_F$ equal to:

$$N_F=3^n \qquad (1)$$

Referring now to FIG. 3 there is shown a three stage counter having $3^3$ or 27 possible format combinations. The corresponding set of trinary controls for each format are shown in FIG. 3*b* in which 0, 1 and 2 corresponding to a clamped binary 0, clamped binary 1, and unchanged or unclamped state, respectively. As can be seen from FIGS. 3*a* and 3*b* the first combination performs no clamping (all 2's) and therefore the counter and matrix output operates conventionally. FIGS. 3*a* and 3*b* illustrate the ability to selectively change the channels to be sampled and their respective sampling rates. For example, format combinations numbered 4 and 5 described in the example explained by Truth Tables 2*c* and 2*d*, provide for sampling the selected channels at twice the basic sampling rate.

The controllable format concept is described in connection with a binary counter, however, the technique is equally applicable to different counting techniques other than radix 2. In the general case, the stage control radix will always equal that of the counter plus one.

Figure 4:
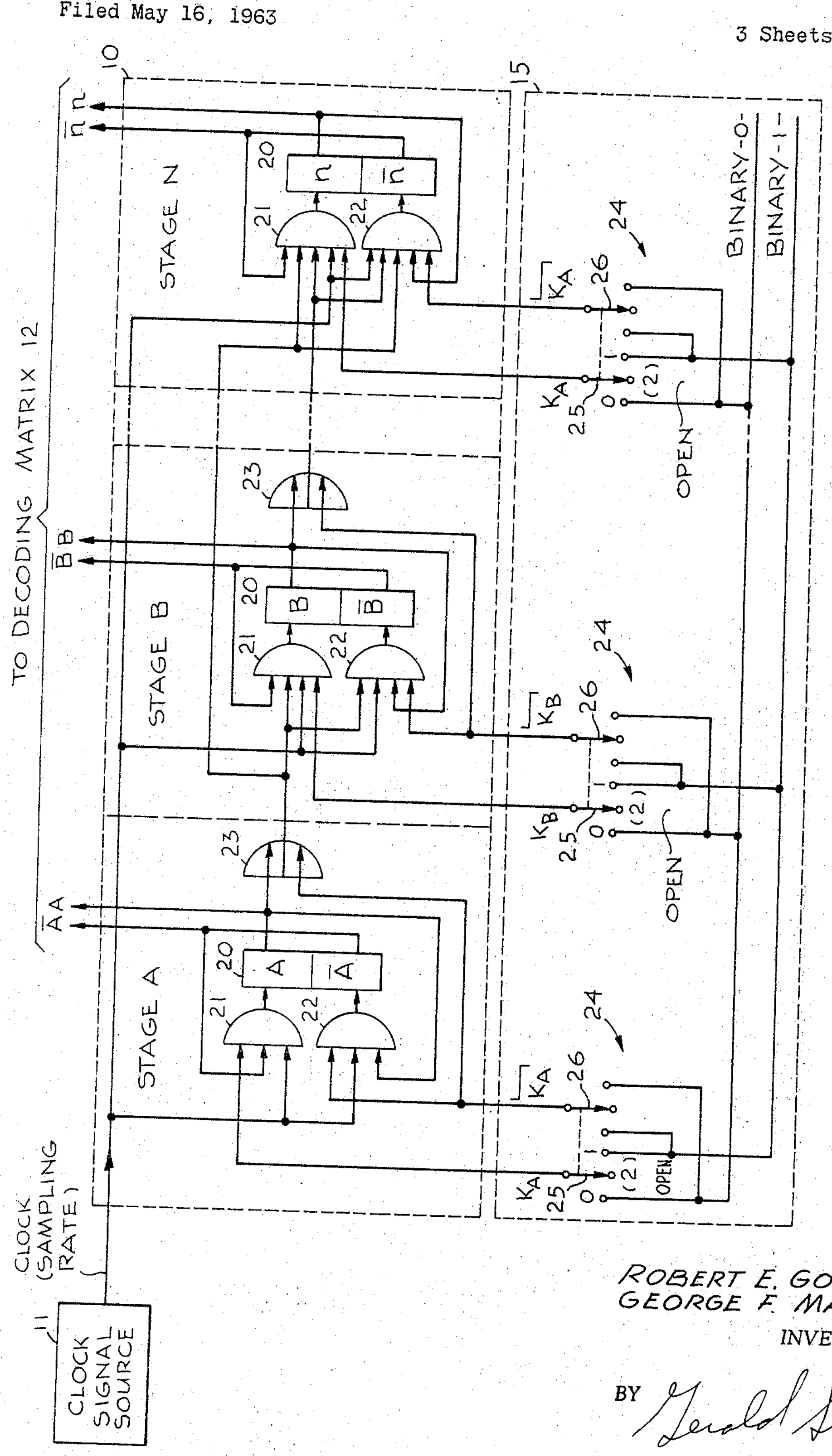
FIG. 4 is a more detailed illustration of portions of the format generator illustrated in FIG. 1.

Referring now to FIG. 4 there is shown in more detail portions of the binary counter 10 and the individual counter control 15 illustrated in FIG. 1. The individual stages A, B and N are all substantially identical and comprise a binary counter 20 having a first state and a second state, and at least two AND gates 21 and 22 which cooperate with the counter in the normal manner to perform the counting function. The logic for performing the skipping or by-pass operation of the incoming clock pulses during the clamping operation is performed by an additional cooperating OR gate 23 located in each stage but the last one. The ouput from each stage feeding the decoding matrix 12 comprise a pair of lines, one for each state, from each of the counters 20. The individual counters A, B and N are capable of being individually clamped in either a neutral state (2), a binary 1 state or a binary 0 state by means of a plurality of separate switches 24, one for each stage, and located in the individual counter control 15. Each switch 24 comprises two poles 25 and 26 having at least three positions identified as binary 0, neutral (2) and binary 1. The switches 24 are illustrated as being mechanical for convenience only, since it is apparent that any suitable switch device capable of performing similar functions may be used. The switches and logic are interconnected in order to allow any number of counter stages in any pattern to be easily changed to a clamped binary 1 or clamped binary 0 state and still not inhibit the normal counting of those binary stages not clamped. As mentioned previously, this technique is sometimes referred to as clamp and bypass since any stage that is clamped as determined by the format desired, is bypassed as far as the counting process is concerned while still maintaining and reading out the clamped state to the decoding matrix 12.

The logic equations explaining the operation of the system are based on the requirements that in the neutral position (2) of switch 24 the corresponding stage of the counter 20 operates in the normal manner; that in the clamped binary 1 position the state of flip-flop counter 20 is held in the true position; and that in the clamped binary 0 position the state of the flip-flop counter 20 is held false; however, the logic as provided by the OR gate 23 does not inhibit the counting process since a true output is always present from either the counter 20 or the pole 26 of switch 24.

An extra input to each input AND gate 21 and 22 controls the clamping as shown by the following example. The clamped binary 1 condition for the A stage requires that AND gate 21 is enabled and AND gate 22 is inhibited. This is mechanized by the switch 24 being connected in circuit so that pole 25 is in the binary 1 position and pole 26 is in the binary 0 position. If stage A had been in the binary 1 (or true) state then the clamped binary 1 already existed and both gates 21 and 22 are automatically inhibted. Since the A output is now always true the counting process behaves as if this stage did not exist. As shown, however, the actual states of the counter both clamped and counting are fed to the decoding matrix 12. For the clamped binary 0 condition, switch 24 is positioned to place pole 25 in the binary 0 position and pole **26*a* in the binary 1 position with the result that A is now clamped (by the previously discussed logic) to the binary 0 (or false) state. Since any stage of the counter does not inhibit the counting process, the inhibit influence of the false output is bypassed by the OR gate 23 with a true state output from pole 26. Those stages which are not clamped operated as if the extra AND inputs to gates 21 and 22 and the extra input to the OR gate 23** were not present.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. A counter comprising
a plurality of stages connected in an ordered relationship, each of said stages having *n* states,
means for selectively clamping or unclamping said selected stages, said selected stages being clamped in any of said *n* states,
means for by-passing said selected stages whereby said selected stages are by-passed and the next stage in said ordered relationship is advanced, and
means for reading out the condition of the states of each stage of said counter whereby the indicated total of the counter may be decoded.

2. A counter comprising
a plurality of stages connected in an ordered relationship, each of said stages having at least a true state and a false state,
means for selectively clamping or unclamping selected stages, said selected stages being clamped in either said true state or said false state,
means for by-passing said selected stages by generating an indicated true output from each of said selected stages whereby the next stage in said ordered relationship is advanced, and
means for reading out the condition of the states of each stage of said counter whereby the indicated total of the counter may be decoded.

3. A counter comprising
a plurality of stages connected in an ordered relationship, each of said stages having a true state and a false state,
means for selectively clamping or unclamping selected stages, said selected stages being clamped in either said true state or said false state,
means for generating an indicated true output from each of said stages clamped in a false state whereby said clamped stages are by-passed and the next stage in said ordered relationship is advanced, and means for reading out the condition of the states of each stage of said counter whereby the indicated total of the counter may be decoded.

4. A controllable system for generating a variable sequence of output signals comprising a counter having a plurality of stages in an ordered relationship and adapted to receive repetitive clock pulses, each of said stages having *n* states, means for selectively clamping or unclamping said selected stages, said selected stages being clamped in any of said *n* stages, means for by-passing said selected stages whereby received pulses by-pass the selected stages and advance the next stage in the ordered relationship, and output decoding means responsive to all of said stages for continuously generating a separate output signal as a function of the indicated output of said counter.

5. A controllable system for generating a variable sequence of output signals comprising a counter having a plurality of stages in an ordered relationship and adapted to receive repetitive clock pulses, each of said stages having at least a first state and a second state, means for individually clamping selected stages in a first state, means for by-passing said selected stages whereby received pulses by-pass the selected stages and advance the next stage in the ordered relationship, and output decoding means responsive to the indicated output of said counter for generating an output signal.

6. A controllable system for generating a variable sequence of output signals comprising a counter having a plurality of stages in an ordered relationship and adapted to receive receptitive clock pulses, each of said stages having at least a true state and a false state, means for selectively clamping or unclamping selected states, said selected states being clamped in either said true or said false state, means for generating an indicated true output from each of said stages clamped in a false state whereby said clamped stages are by-passed and the next stage in said ordered relationship is advanced, and output decoding means responsive to each stage of said counter for continuously generating a separate output signal.

7. A controllable format matrix comprising a counter having a plurality of stages in an ordered relationship and adapted to receive repetitive clock pulses, each of said stages having *n* states, means for individually clamping selected stages in a preferred state, means for by-passing said clamped stages whereby received pulses by-pass the selected stages and advance the next stage in the ordered relationship, and output decoding means responsive to the indicated output of said counter including said selected stages for continuously generating an output signal.

8. A controllable system for generating a variable sequence of output signals comprising a counter having a plurality of stages in an ordered relationship and adapted to receive repetitive clock pulses, each of said stages having at least a first state and a second state, means for generating a first signal representative of said first state and a second signal representative of said second state, means for connecting individual stages to said first signal thereby clamping said stages, means in each stage for OR gating the output of said first state with said second signal whereby received pulses by-pass said clamped stages and advance the next stage in the ordered relationship, and output decoding means responsive to all of said stages in said counter for continuously generating an output signal.

9. A binary counter comprising a plurality of stages connected in an ordered relationship, each of said stages comprsing a flip-flop element having a true state and a false state, a first AND gate, a second AND gate and an OR gate, the output of the true state of said flip-flop element being connected to said OR gate, said first and second AND gates connected in circuit with said flip-flop element for providing the counting function, clamping means individually controlilng each of said stages for generating a first signal indicative of a true output and a second signal indicative of a false output, selective switching means in each stage having a first position for simultaneously connecting said first signal to said first AND gate and said second signal to both said second AND gate and said OR gate, said switching means having a second position for simultaneously connecting said second signal to said first AND gate and said first signal to both said second AND gate and said OR gate, said switching means having an open or off position, and means for reading out the condition of the states of each stage of said counter whereby the indicated total of the counter may be decoded.

References Cited

UNITED STATES PATENTS

| | | | |
|---|---|---|---|
| 2,540,442 | 2/1951 | Grosdoff | 235—92 |
| 2,792,991 | 6/1957 | Di Cambio | 235—92 |
| 2,872,110 | 2/1959 | Snyder et al. | 235—92 |
| 2,938,193 | 5/1960 | Eckert | 328—48 |
| 3,054,059 | 9/1962 | Ingerman | 328—42 |
| 3,083,907 | 4/1963 | Crocker et al. | 235—92 |

DARYL W. COOK, *Acting Primary Examiner.*

JOHN F. MILLER, *Examiner.*

G. J. MAIER, *Assistant Examiner.*